United States Patent [19]

Doak

[11] Patent Number: 4,469,844

[45] Date of Patent: Sep. 4, 1984

[54] BLENDS OF A RUBBER-MODIFIED POLYVINYL CHLORIDE RESIN AND RUBBER-MODIFIED POLYMER OF A VINYL AROMATIC MONOMER AND UNSATURATED DICARBOXYLIC ACID ANHYDRIDE MONOMER

[76] Inventor: Kenneth W. Doak, 3469 Burnett Dr., Murrysville, Pa. 15668

[21] Appl. No.: 494,708

[22] Filed: May 16, 1983

[51] Int. Cl.$^3$ .................. C08L 51/04; C08L 53/00
[52] U.S. Cl. ........................... 525/71; 525/74; 525/75; 525/76; 525/78; 525/80; 525/84; 525/85
[58] Field of Search ............... 525/71, 74, 64, 75, 525/76, 78, 80, 84, 83

[56] References Cited

U.S. PATENT DOCUMENTS

| | | | |
|---|---|---|---|
| 3,626,033 | 12/1971 | Keskkula | 525/74 |
| 3,642,949 | 2/1972 | Stafford | 525/74 |
| 3,898,301 | 8/1975 | Konishi et al. | 525/74 |
| 4,197,376 | 4/1980 | Lee et al. | 525/74 |
| 4,269,950 | 5/1981 | Abolins et al. | 525/74 |
| 4,305,869 | 12/1981 | Lee et al. | 525/74 |
| 4,311,806 | 1/1982 | Dufour | 525/74 |
| 4,329,272 | 5/1982 | Dufour | 525/74 |
| 4,339,544 | 7/1982 | Doak | 525/63 |

FOREIGN PATENT DOCUMENTS 2015007A 9/1979 United Kingdom .

OTHER PUBLICATIONS

Hall, Kruse, Mendelson and Trementozzi, Organic Coatings & Plastics Chemistry Div., vol. 47, p. 298, Meeting of the Am. Chem. Soc., Sep. 12-17, 1982.

Primary Examiner—J. Ziegler
Attorney, Agent, or Firm—Parmelee, Miller, Welsh & Kratz

[57] ABSTRACT

A polyblend exhibiting high heat distortion temperatures, high impact strength, good processability, and which can be made in a substantially transparent form is produced from (a) 80-20 percent of a rubber-modified vinyl chloride resin, prepared by polymerization of vinyl chloride in the presence of 2-20 percent of a rubber; and (b) 20-80 percent of a rubber-modified copolymer or terpolymer of a vinyl aromatic monomer, such as styrene, an unsaturated dicarboxylic anhydride, such as maleic anhydride, an optional third monomer such as methyl methacrylate or acrylonitrile, prepared by polymerizing the monomers in the presence of 5-25 percent of one or more rubbers; and (c) optionally 0 to 10 percent of an ungrafted rubber, such as a block copolymer of 1,3-butadiene and styrene; and/or 0-35 percent of a graft copolymer of rubber, styrene, and methyl methacrylate or acrylonitrile.

24 Claims, No Drawings

BLENDS OF A RUBBER-MODIFIED POLYVINYL CHLORIDE RESIN AND RUBBER-MODIFIED POLYMER OF A VINYL AROMATIC MONOMER AND UNSATURATED DICARBOXYLIC ACID ANHYDRIDE MONOMER

RELATED INVENTION

Reference is made to the application of Kenneth W. Doak, Ser. No. 494,709 filed on even date herewith, and entitled "Blends of a Rubber-Modified Polyvinyl Chloride Resin and a Polymer of a Vinyl Aromatic Monomer and Unsaturated Dicarboxylic Acid Anhydride Monomer".

BACKGROUND OF THE INVENTION

The present invention relates to blends of (a) rubber-modified vinyl chloride resins (PVC), prepared by polymerizing vinyl chloride in the presence of 2 to 20 percent of rubber; (b) rubber-modified copolymers or terpolymers of a vinyl aromatic monomer, such as styrene or p-methylstyrene, an unsaturated dicarboxylic acid anhydride such as maleic anhydride, and an optional third monomer such as methyl methacrylate or acrylonitrile, prepared by polymerizing the monomers in the presence of 5 to 25 percent of one or more rubbers; and (c) optionally 0 to 10 percent of an ungrafted rubber such as a block copolymer of 1,3-butadiene and styrene; and/or 0 to 35 percent of a graft copolymer of rubber, styrene, and methyl methacrylate or acrylonitrile.

Vinyl chloride resins have good molding characteristics, especially when plasticized, and have good physical properties. However, they have a relatively low softening temperature particularly when they contain a low molecular weight plasticizer, so that they do not have good dimensional stability at temperatures above about 60° C. (or lower) to about 75° C. In the past, various copolymers or terpolymers with higher softening temperatures than a vinyl chloride resin have been blended into the vinyl chloride resin in order to provide good dimensional stability at a higher temperature. The blending of copolymers or terpolymers containing a vinyl aromatic monomer and maleic anhydride, with optionally a third monomer, in order to modify the properties of a vinyl chloride resin or an acrylonitrile, butadiene, styrene polymer has heretofore been described in various patents.

U.S. Pat. No. 3,642,949 describes blends of copolymers of styrene and maleic anhydride (S/MA) with ABS graft copolymer (rubber-modified copolymer of styrene and 5 to 40 percent of acrylonitrile, prepared by polymerizing the monomers in the presence of rubber) in order to increase the softening temperature of the latter. The S/MA copolymers contained 5 to 35 percent of maleic anhydride, preferably 18 to 25 percent, and were not rubber-modified.

U.S. Pat. No. 3,626,033 describes the preparation of blends of a S/MA copolymer, a vinyl chloride resin, and a high-rubber ABS graft copolymer containing at least 50 percent of rubber. The styrene-acrylonitrile (S/AN) copolymer preferably contained 24 to 28 percent of acrylonitrile, while the S/MA copolymer contained 15 to 30 percent, and preferably about 19 percent, of maleic anhydride. This patent also describes the preparation of blends of a vinyl chloride resin, a S/MA copolymer containing 18 percent of maleic anhydride, and a graft copolymer reported to be a copolymer of methyl methacrylate and acrylonitrile. S/MA copolymers were effective in increasing the softening temperature of the blends. For example, a blend of a vinyl chloride resin and an ABS resin in a 75:25 ratio exhibited a heat distortion temperature of 77.5° C., compared with a 71.5° C. vinyl chloride resin alone. A three-component blend containing 20 percent of an unmodified S/MA copolymer (containing 18 percent of maleic anhydride), together with a vinyl chloride resin and an ABS resin in the same ratio as in the two-component blend, exhibited a heat distortion temperature of 91° C. However, notched impact strength was reduced.

U.S. Pat. No. 4,197,376 describes the preparation of blends of ABS graft copolymers with (a) rubber-modified copolymers of 85 to 65 percent of styrene and 15 to 35 percent (preferably 20 to 30 percent) of maleic anhydride and 2 to 30 percent of rubber (based on total weight of the composition), and (b) rubber-modified terpolymers of styrene, maleic anhydride, and up to 30 percent of a copolymerizable monomer such as methyl methacrylate (S/MA/MM) or acrylonitrile (S/MA/AN). The blends contained 5 to 40 percent of rubber (based on the total weight of the composition). Such blends exhibited better impact strength then blends of unmodified S/MA copolymer and ABS, or of rubber-modified S/MA copolymer with unmodified S/AN copolymer, even when the blends were compounded to the same total rubber level.

U.S. Pat. No. 4,311,806 describes the preparation of blends of a vinyl chloride resin with rubber-modified S/MA copolymers in which the relative weight proportions were 50 to 85 percent of a vinyl aromatic monomer, 15 to 30 percent of maleic anhydride, and 0 to 20 percent of a third monomer such a methyl methacrylate or acrylonitrile. The monomers were polymerized in the presence of 5 to 25 percent by weight of rubber (based on total weight). The blends could optionally contain 0 to 40 percent of ABS graft copolymers or MBS graft copolymers (rubber-modified copolymers of styrene and methyl methacrylate). Again, the copolymers containing maleic anhydride were effective in increasing the heat softening temperatures. The addition of the vinyl chloride resin to the rubber-modified terpolymer caused a large reduction in the impact strength. The reduction was less when about 20 percent of an ABS resin or MBS resin was added to the blend.

U.S. Pat. No. 4,339,554 describes the preparation of blends of a vinyl chloride resin with 20 to 40 percent of S/MA copolymers containing preferably 18 to 25 percent of maleic anhydride. Blends were also described which contained the corresponding rubber-modified copolymers, which had been prepared by polymerizing the monomers in the presence of 5 to 30 percent of one or more rubbers, based on total weight of the rubber-modified copolymer.

Hall, Kruse, Mendelson, and Trementozzi (Preprint for Organic Coatings and Plastics Chemistry Division, Volume 47, page 298; Meeting of Am. Chem. Soc., Sept. 12-17, 1982) described the formation of blends of various random S/MA/X terpolymers (both rubber-modified and unmodified versions) with random styrene-acrylonitrile (S/AN) copolymers or ABS graft copolymers. The termonomers were acrylonitrile, methyl methacrylate, isobutylene, methyl acrylate, and ethyl acrylate. They defined composition ranges for S/AN copolymers, S/MA copolymers or S/MA/X terpolymers within which blends exhibited compatability. Compatible pairs exhibited softening temperature (glass transition temperatures) intermediate between those of the two components. Data for blends of ABS and S/MA/X terpolymers were summarized from U.S. Pat. Nos. 4,197,376 and 4,305,869.

British Pat. No. 2,015,007, which is incorporated into this disclosure by reference, discloses blends of vinyl chloride resins with block copolymer rubbers of a diene and a vinyl aromatic monomer, together with up to 20 percent of an impact modifier: (a) MBS, a graft copolymer of methyl methacrylate, a butadiene-based rubber, and styrene; or (b) ABS, a graft copolymer of acrylonitrile, a butadiene-based rubber, and styrene. Blends of rubber-modified vinyl chloride resins with block copolymer rubbers were also disclosed. In both types of blends, the block copolymer rubbers increased impact strength, particularly at low temperatures after aging.

SUMMARY OF THE INVENTION

This invention describes the preparation of new polyblends of rubber-modified polymers having high heat distortion temperatures, high impact strength, and good processability. These comprise:

A. 80–20 percent by weight of a rubber-modified vinyl chloride resin, optionally containing up to 20 percent, based on total monomers, of a copolymerizable, ethylenically unsaturated comonomer, prepared by polymerization of the monomers in the presence of 2–20 percent, based on total weight of the resin, of a rubber to form a graft copolymer dispersed as discrete particles or strands, and B. 20–80 percent by weight of a rubber-modified copolymer of a vinyl aromatic monomer and an unsaturated dicarboxylic acid anhydride in weight ratios of 95:5 to 70:30, optionally containing up to 25 percent of a third monomer, based on total monomers, polymerized in the presence of 5–25 percent, based on total weight of the rubber-modified polymer, of one or more rubbers to form a graft copolymer dispersed as discrete particles.

To the polyblend there may also be added up to 10 percent by weight, based on the weight of the polyblend, of an ungrafted block copolymer rubber containing 20–50 percent by weight of a vinyl aromatic monomer, preferably styrene or p-methylstyrene, and 80–50 percent 1,3-polybutadiene, and hydrogenated such block copolymer rubber, dispersed as discrete particles.

To the polyblend there may also be added up to 35 percent by weight, based on the weight of the polyblend, of a graft copolymer of 30–80 percent of methyl methacrylate and 70–20 percent of a vinyl aromatic monomer, preferably styrene or p-methylstyrene, said copolymer being grafted onto 10–60 percent, based on weight of the graft copolymer, of a substrate rubber, or a graft copolymer of 20–40 percent of an unsaturated nitrile, such as acrylonitrile or methacrylonitrile, and 80–60 percent of a vinyl aromatic monomer, said copolymer being grafted onto 10–60 percent, based on the weight of the graft copolymer, of a substrate rubber.

DESCRIPTION OF THE INVENTION

Heretofore, the preparation of blends of a vinyl chloride resin with styrene-maleic anhydride copolymers of S/MA/X terpolymers (both glassy and rubber-modified) involved the use of a vinyl chloride resin which might contain various additives, including a relatively large amount of low molecular weight plasticizers. However, blends have not been described which contain a rubber-modified vinyl chloride resin prepared by the polymerization of vinyl chloride in the presence of rubber.

The use of a rubber-modified vinyl chloride resin offers advantages over the use of unmodified vinyl chloride resins in blends with copolymers and terpolymers containing maleic anhydride. A vinyl chloride resin which contains little or no low molecular weight plasticizer is difficult to process, and it is difficult to obtain a uniform mixture with a rubber-modified copolymer or terpolymer containing maleic anhydride. A nonuniform distribution of graft copolymer particles may therefore result, so that impact strength and other properties may be adversely affected. Rubber-modified vinyl chloride resins have a lower melt viscosity, better processability, and much higher impact strength than the corresponding unmodified polymers. A more uniform dispersion of graft copolymer particles can be obtained in the blend than when using an unmodified vinyl chloride resin because (a) both components in the blend contain particles dispersed during synthesis, and (b) it is easier to obtain a more uniform mixture of the two components because of the lower melt viscosity of a rubber-modified vinyl chloride resin compared with an unmodified vinyl chloride resin.

The use of relatively large amounts (e.g. up to 30 percent) of a low molecular weight plasticizer such as dioctylphthalate will also improve the processability of rubber-modified or unmodified vinyl chloride resins and provide easier mixing in blends. However, its use significantly reduces the softening temperature, as well as stiffness and rigidity, and hence will adversely affect the properties of blends. Therefore, it is preferable to use little (less than 10 percent) or no plasticizer if maximum heat distortion temperatures are to be obtained.

When a rubber-modified vinyl chloride resin is used in blends, a lower level of rubber may be used in the rubber-modified maleic anhydride polymer, hence making the preparation of this polymer easier. It is generally known that the manufacture of rubber-modified polymers containing a high rubber level by a bulk process is more difficult than for those containing a lower level. A lower level of rubber may also be used in the ABS resin or MBS resin.

The rubber-modified vinyl chloride resin is prepared by the polymerization of vinyl chloride in the presence of 2 to 20 percent of a rubber selected from the group consisting of E/VA copolymers (ethylene containing up to 50 percent of vinyl acetate); chlorinated polyethylene containing 20 to 40 percent of chlorine; copolymers of ethylene and propylene or a higher alpha-olefin such as butene-1, hexene-1, 4-methyl-1-pentene, octene-1 and the like, optionally containing less than 15 weight percent (preferably less than 6 weight percent) of a diene, preferably unconjugated, such as ethylidene norbornene, 1,4-hexadiene, and the like, as described in U.S. Pat. No. 4,071,582; acrylate rubbers such as a polybutyl acrylate; E/EA copolymers (copolymers containing preferably 85–25 percent of ethylene and 15–75 percent of ethyl acrylate) or E/MA copolymers (of ethylene and methyl acrylate), as described in U.S. Pat. No. 4,012,460; epichlorohydrin rubbers, and block copolymers of 1,3-butadiene or isoprene and 10 to 55 percent of a vinyl aromatic monomer such as styrene, p-methylstyrene, and the like; hydrogenated products of such block copolymers; and copolymers of cyclopentene and a minor amount of ethylene or a higher alpha-olefin.

The compositions of the rubbers are chosen to prevent complete compatibility with the vinyl chloride resin, but to give a good balance between compatibility and incompatibility, so that the rubber (or graft copolymer) is dispersed as a separate phase, usually as small particles wetted by ungrafted vinyl chloride resin, and the product retains most of the properties (e.g. rigidity and softening point) of a rigid vinyl chloride resin but with enhanced impact strength. Products prepared using the above saturated rubbers (or those containing only a very small amount of a diene) are generally suitable for use in outdoor applications. For indoor applications it is feasible to use unsaturated rubbers such as polybutadiene, block copolymers of butadiene and up to 55 percent of a vinyl aromatic monomer (e.g. styrene), butadiene-acrylonitrile rubber, and the like. Various block copolymers have been described in British Pat. No. 2,015,007.

The preparation of rubber-modified vinyl chloride resins has been described in various patents; some resins are available commercially. The resin may comprise a homopolymer of vinyl chloride, or a copolymer of vinyl chloride and up to about 20 percent by weight of a copolymerizable, ethylenically unsaturated comonomer such as ethylene, propylene or other alpha-olefin with 4–8 carbon atoms, vinyl acetate, vinylidene chloride, alkyl acrylate, acrylic or methacrylic acid, methyl methacrylate, and the like. Preferably, the amount of comonomer will be less than 10 percent because of the adverse effect on heat distortion temperature and rigidity, and most preferably will be vinyl acetate, ethylene, propylene, or alpha-olefin containing 4–8 carbon atoms.

The preparation of a rubber-modified polyvinyl chloride resin by suspension processes has been reviewed by Burgess, *Manufacturing and Processing of PVC*, MacMillan, New York, 1982. Thus, the preparation of graft copolymers containing chlorinated polyethylene has been described in British Pat. No. 1,029,634. British Pat. Nos. 1,021,324 and 1,027,710 describe the suspension polymerization of a solution of vinyl chloride containing 5 to 15 percent of E/VA copolymer. Graft copolymers containing up to 50 percent of E/VA copolymer may be prepared which may be subsequently diluted with additional vinyl chloride resin to produce a composition containing 5 to 10 weight percent of E/VA copolymer. The preparation of graft copolymers of vinyl chloride and polyacrylate rubbers, e.g. polybutyl acrylate, by suspension polymerization was also described by Burgess. U.S. Pat. No. 3,812,204 describes emulsion and suspension processes for polymerizing vinyl chloride in the presence of polyolefin elastomers.

Bulk processes may also be used to prepare the rubber-modified vinyl chloride resin. U.S. Pat. No. 4,007,235 describes a process for the polymerization of vinyl chloride in the presence of elastomeric olefin polymers such as an ethylene-propylene copolymer or a terpolymer containing a small amount of a diene such as ethylidene norbornene or 1,4-hexadiene, to obtain rubber-modified copolymers containing about 6 to 8 percent of rubber with some vinyl chloride grafted to it. The products had reduced particle (grain) size, easy processability, and much higher impact strength, compared with an unmodified polymer. U.S. Pat. No. 4,195,137 describes the preparation of rubber-modified vinyl chloride resins containing about 3.5 to 5.5 percent of elastomeric olefin polymers. U.S. Pat. No. 4,071,582 describes the polymerization of vinyl chloride in the presence of about 6.0 to 10 percent of olefin copolymer or terpolymer (EPDM) to obtain a product with reduced particle size and melt viscosity, very high impact strength, and easy processability. Some polyvinyl chloride was grafted to more than 50% of the EPDM. The dispersed rubber and graft copolymer phase had a particle size of 0.1 to 0.5 micron in diameter. The glass transition temperature was 72° C. and the heat distortion temperature was 64.8° C., compared with 65° C. for an unmodified polymer. German Off. No. 1,528,779 describes the polymerization of vinyl chloride in the presence of polyepichlorohydrin or copolymers to prepare a graft copolymer. U.S. Pat. No. 4,012,460 describes the two-stage bulk polymerization of vinyl chloride in the presence of a copolymer of ethylene and methyl or ethyl acrylate. The dispersed graft copolymer had a particle size of 0.1–0.5 micron in diameter.

It should be understood that in a rubber-modified vinyl chloride resin, only a small percentage of the polyvinyl chloride chains are actually grafted to the rubber chains, as discussed in U.S. Pat. Nos. 3,812,204, 4,071,582, and 4,012,460. There is some ungrafted rubber, usually in the range of 5 to 50 percent of the total rubber present. The amount of polyvinyl chloride grafted to rubber chains may be as great, or somewhat greater, than the amount of rubber present. When olefin rubbers are used, the amount of grafted polyvinyl chloride is greater for a terpolymer containing a diene monomer than for a saturated copolymer. References to grafted polyvinyl chloride obviously refer to such mixtures. Reference to other graft polymers, or rubber-modified polymers, also refer to mixtures of ungrafted copolymer or terpolymer chains, some chains grafted to rubber, and some ungrafted rubber.

The rubber-modified vinyl chloride resin, 20 to 80 weight percent, is intimately mixed with 80 to 20 weight percent of a rubber-modified polymer containing a vinyl aromatic monomer and an unsaturated dicarboxylic acid anhydride, in weight ratios of 95:5 to 70:30, and optionally up to 25 percent (based on total monomers) of a termonomer selected from the group consisting of methyl methacrylate and an unsaturated nitrile such as acrylonitrile or methacrylonitrile. When acrylonitrile is used as termonomer, the maximum amount in the terpolymer generally is not greater than 20 percent. The monomers are polymerized in the presence of 5 to 25 percent, based on total weight of the rubber-modified polymer, of a rubber with a glass transition temperature below −10° C.

The vinyl aromatic monomer which forms a part of the rubber modified polymer is preferably styrene or p-methylstyrene (vinyl toluene containing over 90 percent of p-methylstyrene) but may also include other nuclear methyl substituted styrenes, dimethylstyrenes, monochlorostyrenes (e.g. o- or p-chlorostyrene, or mixtures), alpha-methyl-p-methylstyrene, 2-chloro-4-methylstyrene, tert-butylstyrenes, dichlorostyrenes, especially 2,4-dichlorostyrene, and the like. When alpha-methylstyrene, tert-butylstyrene, or dichlorostyrene is used, it is preferable to use a mixture with styrene or p-methylstyrene to form a terpolymer of maleic anhydride and two vinyl aromatic monomers. The preferred anhydride is maleic anhydride, although citraconic anhydride and itaconic anhydride or other anhydrides may also be suitable, while the preferred termonomer is methyl methacrylate or acrylonitrile.

These rubber-modified polymers are used in the blends because they have higher impact strength than unmodified polymers, and the blends generally exhibit higher impact strength than when unmodified polymers are used. These polymers contain 5 to 25 percent (based on total weight) of a rubber or a mixture of rubbers, and are prepared by copolymerizing the monomers in the presence of the rubber.

The rubbers are selected from the group consisting of epichlorohydrin rubbers (Hydrin elastomers of B. F. Goodrich Co.); polybutadiene; random copolyers of 1,3-butadiene and a vinyl aromatic monomer, especially styrene or p-methylstyrene; copolymers of butadiene and acrylonitrile; chloroprene rubbers; chlorinated polyethylene containing 20 to 40 percent of chlorine; rubbery copolymers of ethylene and vinyl acetate; rubbers based on an acrylate, e.g. butyl acrylate; rubbery copolymers of ethylene and ethyl acrylate or methyl acrylate; copolymers of cyclopentene and a minor amount of ethylene or higher alpha-olefin; rubbers based on ethylene and propylene or other alpha-olefin containing 4–8 carbon atoms, optionally containing a diene termonomer (EPDM); polyisoprene; block copolymers of 1,3-butadiene or isoprene and 10 to 55 percent of a vinyl aromatic compound (especially styrene or p-methylstyrene); hydrogenated products of such block copolymers; and the like. The block copolymers could include the following but are not necessarily limited to (a) linear diblock (or "tapered" block), copolymers containing 10 to 55 percent of styrene, such as the commercial rubbers Solprene 1205, Stereon 720 and 840; (b) radial rubbers such as Solprene 406, 411 and 414; (c) triblock copolymers such as Kraton 1101 and Kraton 1107; (d) hydrogenated styrene-butadiene block copolymers such as Kraton G; and (e) star-shaped copolymers containing up to 20 styrene-butadiene diblock branches, sometimes mixed with polybutadiene branches (U.S. Pat. No. 4,010,226). Various block copolymers are described in British Pat. No. 2,015,007.

For applications where good light resistance is needed, it is desirable to use a rubber such as a hydrogenated styrene-butadiene block copolymer, a rubber based on an acrylate such as butyl acrylate, ethylene-propylene rubbers, epichlorohydrin rubber, and the like. Since the presence of rubber in the polymers tends to reduce their softening temperatures slightly, compared with unmodified polymers, it is sometimes advantageous to use a vinyl aromatic monomer such as p-methylstyrene, or a mixture of styrene or p-methylstyrene with tert-butylstyrene, 2,4-dichlorostyrene, or alpha-methylstyrene, which are expected to give a slightly higher softening temperature than the corresponding maleic anhydride polymers containing styrene as the only vinyl aromatic monomer.

The rubber-modified maleic anhydride copolymers or terpolymers are known compositions, and are prepared by reacting a solution of rubber, maleic anhydride, vinyl aromatic monomer, and optionally methyl methacrylate or an unsaturated nitrile, such as acrylonitrile, at elevated temperatures, usually in the presence of peroxide initiators. The resulting copolymers or terpolymers have a somewhat random distribution of monomer units along the polymer chains. Typically, the Melt Flow (condition L, grams/10 minutes) is between 0.1 and 10, and is somewhat dependent on the polymer composition, as well as the amount and type of rubber.

Various techniques have been described for preparing copolymers and terpolymers containing maleic anhydride. U.S. Pat. Nos. 2,767,804, 2,971,939, and 3,336,267 describe the preparation of copolymers of styrene and maleic anhydride. U.S. Pat. No. 3,919,354 describes the preparation of rubber-modified copolymers of 95 to 65 percent of styrene and 5 to 35 percent of maleic anhydride by copolymerizing the monomers in the presence of 5 to 30 percent of a rubber containing 65 to 100 percent of butadiene, including block copolymer rubbers. The graft copolymer was dispersed as small, discrete particles with average diameters of less than 0.3 micron to 5 microns or higher. U.S. Pat. No. 4,341,695 describes the preparation of rubber-modified (S/MA/MM) terpolymers of 45 to 83 percent of styrene, 15 to 35 percent of maleic anhydride, and 2 to 30 percent of methyl methacrylate by the polymerization of the monomer mixture in the presence of 2 to 30 percent of rubber. U.S. Pat. No. 4,262,096 describes the preparation of terpolymers of styrene, maleic anhydride, and acrylonitrile by the polymerization of the monomer mixture in the presence of 2 to 30 percent of rubber. U.S. Pat. No. 4,197,376 also describes the preparation of rubber-modified copolymers and terpolymers. U.S. Pat. No. 4,108,943 describes the preparation of rubber-modified S/MA copolymers containing various rubbers, including epichlorohydrin rubbers.

The copolymers used in this invention will typically contain a vinyl aromatic monomer and maleic anhydride in weight ratios of 95:5 to 70:30. When copolymers contain styrene or p-methylstyrene, the preferred ratio is about 85:15 to 75:25. When a terpolymer containing acrylonitrile is used, the ratio may be as high as 90:10. When a monochlorostyrene, or a mixture of styrene or p-methylstyrene with dichlorostyrene or monochlorostyrene is used, slightly less maleic anhydride may be used, e.g. the ratio may be as high as 95:5. The amount of rubber used is 5 to 25 percent, based on total weight of the rubber modified polymer.

It is possible to prepare the rubber-modified vinyl chloride resin and rubber-modified polymer with different average graft copolymer particle size, so that after blending there will be a bimodal distribution of particle sizes. For example, the average particle sizes in the two resins might be in the ranges of 0.05 to 0.25 micron for the rubber-modified vinyl chloride resin and 0.4 to 2.0 microns or higher for the rubber modified polymer. If the two resins have a similar particle size, it is possible to obtain a bimodal distribution by the use of a block copolymer with controlled shear during mixing to give a very small particle size.

It is also possible to mix additional ungrafted rubber, or a graft copolymer, or both together, into the blend in order to enhance impact strength. Any of the rubbers listed above may be used in amounts up to about 10 percent based on the total weight of the blend. The preferred rubbers are the block copolymer rubbers containing 50 to 80 percent of butadiene and 50 to 20 percent of a vinyl aromatic monomer, especially styrene or p-methylstyrene, and hydrogenated such block copolymers, which can be dispersed as very small discrete particles, with an average diameter between 0.1 (or less) and 1.0 micron, if shear during mixing is properly controlled.

The graft copolymer (impact modifier) may be used in the blend in amounts up to 35 percent. The preferred copolymer (MBS) comprises a mixture of 20 to 70 percent of a vinyl aromatic monomer, preferably styrene or p-methylstyrene, and 80 to 30 percent of methyl methacrylate (based on the weight of the monomers), copolymerized in the presence of a substrate rubber based on a major amount of 1,3-butadiene. However, if the substrate rubber is a block copolymer, it may contain up to about 50 percent of a vinyl aromatic monomer.

It is also possible to use an ABS resin, a graft copolymer of 60–80 percent of a vinyl aromatic monomer and 40–20 percent of an ethylenically unsaturated nitrile, particularly acrylonitrile or methacrylonitrile. When acrylonitrile is used, the preferred amount is about 20–30 percent, based on weight of the monomers. The preferred amount for methacrylonitrile is about 25–40 percent. The preferred aromatic monomers are styrene, p-methylstyrene, and alpha-methylstyrene, or mixtures thereof. Particularly useful compositions contain 10–40 percent, based on total weight of the composition, of the ABS resin together with the rubber-modified vinyl chloride resin and rubber-modified maleic anhydride polymer in weight ratios of about 67:33 to 40:60.

Suitable MBS impact modifiers for use in this invention have been described in British Pat. Nos. 2,015,007, 1,046,646, and U.S. Pat. No. 4,311,806, but are not necessarily limited to these. British Pat. No. 2,015,007 describes MBS polymers which have a refractive index which matches that of vinyl chloride resins, so that blends of the two are translucent or substantially transparent.

Suitable ABS impact modifiers have been described in British Pat. No. 2,015,007 and U.S. Pat. Nos. 4,197,376, 4,305,869, 4,311,806, 3,642,949, and 3,626,003, but are not necessarily limited to these. British Pat. No. 2,015,007 describes ABS polymers which have a refractive index which matches that of vinyl chloride resins, so that blends of the two are translucent or substantially transparent.

Frequently, both the rubber-modified vinyl chloride resin and rubber-modified maleic anhydride polymer used in the blend exhibit relative poor transparency because the refractive index of the rubber (graft copolymer) particles in each component differs from that of the corresponding matrix in which they are dispersed. Blends of the two rubber-modified polymers also usually exhibit relatively poor transparency. However, each rubber-modified component will be translucent or substantially transparent if the rubber chosen for each has a refractive index which matches that of its corresponding matrix, or if the rubber particles are too small to diffract light, e.g. below 0.5 micron and preferably below 0.25 micron. A blend of the two will be translucent or transparent if the rubber particles from each component have the same refractive index as the resin matrix obtained by blending. Ideally, the copolymer (or terpolymer) matrix will have the same refractive index as the vinyl chloride resin matrix, and a rubber with a matching refractive index is used in the preparation of each rubber-modified component (unless the rubber particles in one component, particularly vinyl chloride resin, are very small).

In one embodiment of this invention, substantially transparent blends are prepared by mixing a substantially transparent rubber-modified vinyl chloride resin with a substantially transparent rubber-modified terpolymer of a vinyl aromatic compound, maleic anhydride, and methyl methacrylate, to form a relatively uniform mixture. The two rubber-modified components must have essentially matching refractive indices. It should be understood that the term "substantially transparent" may represent varying degrees of clarity, and generally means that a film or sheet permits light to pass, and that the form of objects can be distinguished when observed through film or sheet, particularly at close distances. Sometimes transparency may be accompanied by varying degrees of haze, as discussed in British Pat. No. 2,015,007. In some instances, clarity may be sufficiently high to permit typed letters to be read, as discussed in British Pat. No. 1,046,646.

The vinyl chloride resin used may contain any rubber (within the scope of the invention) which has an essentially matching refractive index, or which has all of the rubber (graft copolymer) particles dispersed as very small particles. For example, U.S. Pat. No. 4,012,460 describes the preparation of a clear rubber-modified vinyl chloride resin by polymerizing vinyl chloride in the presence of a copolymer of about 82 percent of ethylene and about 18 percent of ethyl acrylate. It was believed that the refractive index of the copolymer matched closely that of polyvinyl chloride. U.S. Pat. No. 3,812,204 describes the preparation of translucent copolymers containing an olefin rubber.

The composition of the rubber-modified terpolymer will be such that both the matrix and graft copolymer particles have refractive indices which match closely that of the vinyl chloride resin. According to British Pat. No. 2,015,007, butadiene-styrene block copolymers containing about 25–40 percent of styrene have refractive indices which match those of vinyl chloride resins. According to British Pat. No. 1,046,646, copolymers of 30–65 percent of styrene and 70–35 percent of methyl methacrylate, prepared in the presence of block copolymers of 80–50 percent of butadiene and 20–50 percent of styrene, are substantially transparent, suggesting that they have matching refractive indices. A terpolymer matrix containing maleic anhydride, which also has a matching refractive index, may be prepared by adjusting the amount of methyl methacrylate between about 5 and 25 percent, while maintaining the maleic anhydride content within the range defined by the invention. The polymerization methods described in U.S. Pat. Nos. 4,197,376 and 4,341,695 may be used. The rubber used is a block copolymer of butadiene and 20–50 percent (preferably 30–40 percent) of a vinyl aromatic monomer such as styrene or p-methylstyrene, or another rubber with a matching refractive index. Suitable terpolymers containing acrylonitrile or methacrylonitrile in place of methyl methacrylate may also be prepared.

Optionally, up to 10 percent of an additional ungrafted block copolymer rubber with matching refractive index, as described above, may be added to the blend. Such rubber should be dispersed as very small discrete particles.

Optionally, up to 35 percent of a substantially transparent impact modifier (MBS or ABS) with matching refractive index may be added to the blend to improve impact strength while maintaining translucency or transparency. British Pat. No. 2,015,007 describes commercially available MBS and ABS modifiers which have matching refractive indices and give translucent or transparent blends with vinyl chloride resins. Certain transparent, rubber-modified copolymers of styrene and methyl methacrylate, described in British Pat. No. 1,046,646, may also be suitable, particularly those which contain 30–40 percent of a block copolymer rubber.

The rubber-modified vinyl chloride resin and rubber-modified polymer may be blended, in the prescribed amounts, by mechanically working the components at a temperature high enough such that the mass is plasticized, e.g. by mixing on a two-roll mill, an internal mixer such as a Brabender or Banbury mixer, a twin-screw extruder, or a Farrell mixer. In order to provide a homogenous blend, the mixing equipment must provide a high shear. Some extruders, especially single screw extruders, may not provide sufficient shear for some blends. In some cases it may be necessary to plasticize first the component which has the highest melt viscosity and then add the other components in one or more increments. A batch mixer, or a high shear continuous mixer with one or more side feed ports, might be used. When more than two components are blended, it may sometimes be desirable to prepare first a blend of two components.

The various rubber-modified vinyl chloride resins will exhibit different heat distortion temperatures, depending on the amount of comonomer, rubber, plasticizer, stabilizers and other additives used. Therefore, the heat distortion temperature of a blend will be dependent of the heat distortion of both the rubber-modified vinyl chloride resin, as well as that of the rubber modified copolymer or terpolymer containing maleic anhydride, and will be intermediate between those of the two components of the blend.

The following illustrates the types and amounts of the components used in the blended compositions of the present invention which will exhibit heat distortion temperatures significantly higher than those of the vinyl chloride resin used in the blends.

In one example, a rubber-modified vinyl chloride resin which contains about 6 percent of rubber and less than about 5 percent of plasticizer, and which exhibits a heat distortion temperature of about 66° C. is mixed in amounts of 65 to 50 percent by weight with 35 to 50 percent of a rubber-modified terpolymer of styrene, maleic anhydride, and methyl methacrylate, in which the monomers have a weight ratio of about 72:18:10, and are polymerized in the presence of about 15 percent (based on total weight) of a block copolymer rubber of butadiene and styrene. The heat distortion temperatures of the blends will vary between about 70° C. and about 78° C. or higher, and impact strengths will be superior to those for comparable blends in which an unmodified vinyl chloride resin is used.

In one variation, a similar result will be obtained if a part or all of the styrene in the rubber-modified terpolymer used in the blends is replaced by p-methylstyrene. In another variation, about 20 percent (based on total weight of the blend) of an impact modifier (a copolymer of styrene and methyl methacrylate grafted onto a butadiene-based rubber) is added to the blends to improve impact strength with no significant effect on heat distortion temperatures.

In another example, the rubber-modified vinyl chloride resin is mixed in amounts of 30 to 50 percent with 50 to 70 percent of a rubber-modified copolymer of styrene and maleic anhydride, in which the monomers have a weight ratio of about 80:20, and are polymerized in the presence of about 15 percent of a block copolymer rubber of butadiene and styrene. The heat distortion temperatures of the blends will vary between about 74° C. and about 88° C. or higher.

In one variation, a similar result will be obtained if a part or all of the styrene in the rubber-modified copolymer is replaced by p-methylstyrene. In another variation, about 6 percent (based on total weight of the blend) of a block copolymer rubber of butadiene and at least 20 percent of styrene is added to the blend and is dispersed as small discrete particles to improve impact strength. In another variation, a rubber-modified copolymer of vinyl chloride and 3-5 percent of propylene is used.

In another example, an intimate mixture is made of the following three components (with percentages based on weight of the composition): (1) about 45 percent of a rubber-modified vinyl chloride resin with a heat distortion temperature of about 66° C., and containing about 6 percent of an ethylene-propylene-diene rubber; (2) about 25 percent of an ABS resin containing about 40 percent of a butadiene-based rubber, and having a styrene:acrylonitrile ratio of about 75:25; and (3) 30 percent of a rubber-modified 82:18 copolymer of styrene and maleic anhydride, containing about 15 percent of a block copolymer rubber of butadiene containing about 20 percent styrene. The heat distortion temperature will be about 88° C. or slightly higher, significantly higher than will be obtained in a two-component blend containing the same proportions of the rubber-modified vinyl chloride resin and the ABS resin. The impact strength of the three-component blend will also be significantly higher than will be obtained in a similar blend except that an unmodified vinyl chloride resin is used, or an unmodified copolymer of styrene and maleic anhydride is used. In order to obtain a somewhat higher heat distortion temperature, up to 50 percent of the styrene in the ABS resin may be replaced by alpha-methylstyrene.

What is claimed is:

1. A polyblend composition comprising:
    (a) 80-20 percent by weight of a rubber-modified vinyl chloride resin, containing 0-20 percent, based on total monomers, of a copolymerizable, ethylenically unsaturated comonomer, selected from the group consisting of ethylene, propylene, an alpha-olefin containing 4-8 carbon atoms, vinyl acetate, vinylidene chloride, alkyl acrylate, acrylic acid, methacrylic acid, and methyl methacrylate, said resin prepared by polymerization of vinyl chloride monomer, and the comonomer, in the presence of 2-20 percent, based on the weight of the resin, of a rubber to form a discretely dispersed graft copolymer, and wherein a major amount of the polymerized vinyl chloride homopolymer or copolymer present in said resin is ungrafted to the rubber; and
    (b) 20-80 percent by weight of a rubber-modified polymer of a vinyl aromatic monomer and an unsaturated dicarboxylic acid anhydride monomer in weight ratios of 95:5 to 70:30, 0-25 percent, based on total monomers, of a copolymerizable ethylenically unsaturated termonomer, selected from the group consisting of methyl methacrylate, acrylonitrile, and methacrylonitrile, said polymer prepared by polymerization of said monomers, and the termonomer, in the presence of 5-25 percent, based on weight of the rubber-modified polymer, of a rubber to form a discretely dispersed graft copolymer.

2. The polyblend composition of claim 1 wherein there is added up to 10 percent by weight, based on the weight of the polyblend, of an ungrafted block copolymer rubber containing 20-50 percent by weight of a vinyl aromatic monomer and 80-50 percent by weight of 1,3-butadiene, or hydrogenated such block copolymer, in the form of discretely dispersed particles.

3. The polyblend composition of claim 2 in which the vinyl aromatic monomer in the ungrafted block copolymer rubber is selected from the group consisting of styrene and p-methylstyrene.

4. The polyblend composition of claim 1 wherein there is added up to 35 percent by weight, based on the weight of the polyblend, of a graft copolymer selected from the group consisting of (a) a copolymer of 30-80 percent by weight of methyl methacrylate and 70-20 percent by weight of a vinyl aromatic monomer, (b) a copolymer of 20-40 percent acrylonitrile and 80-60 percent by weight of a vinyl aromatic monomer, and (c) a copolymer of 20-40 percent methacrylonitrile and 80-60 percent by weight of a vinyl aromatic monomer; said copolymer being grafted onto 10-60 percent based on the weight of the graft copolymer, of a substrate rubber.

5. The polyblend composition of claim 4 wherein there is added up to 10 percent by weight, based on the weight of the polyblend, of an ungrafted block copolymer rubber containing 20-50 percent by weight of a vinyl aromatic monomer and 80-50 percent by weight of 1,3-butadiene, in the form of discretely dispersed particles.

6. The polyblend composition of claim 5 in which the vinyl aromatic monomer in the ungrafted block copolymer rubber is selected from the group consisting of styrene and p-methylstyrene.

7. The polyblend composition according to claim 4 wherein said graft copolymer contains an unsaturated nitrile selected from the group consisting of acrylonitrile and methacrylonitrile, and at least one vinyl aromatic monomer selected from the group consisting of styrene, p-methylstyrene, and alpha-methylstyrene.

8. The polyblend composition according to claim 7 which contains 10-40 percent, based on weight of the composition, of said graft copolymer, and the ratio of rubber-modified vinyl chloride resin to rubber-modified polymer is 67:33 to 40:60.

9. The polyblend of claim 4 in which the substrate rubber is selected from the group consisting of polybutadiene and a block copolymer rubber containing 90-45 percent of butadiene and 10-55 percent by weight of a vinyl aromatic monomer selected from the group consisting of styrene and p-methylstyrene.

10. The polyblend composition of claim 1 wherein the rubber used in the preparation of the rubber-modified vinyl chloride resin is selected from the group consisting of a copolymer of ethylene and a polymerizable comonomer selected from the group consisting of vinyl acetate, ethyl acrylate, methyl acrylate, propylene and butene-1, a terpolymer of ethylene, propylene and a diene monomer, chlorinated polyethylene, a butyl acrylate-based rubber and a block copolymer of a vinyl aromatic monomer and butadiene.

11. The polyblend composition of claim 1 wherein the rubber used in the preparation of the rubber-modified polymer is at least one rubber selected from the group consisting of a block copolymer rubber of butadiene and a vinyl aromatic monomer and hydrogenated such block copolymer rubbers, polybutadiene, a copolymer of ethylene and vinyl acetate, chlorinated polyethylene, epichlorohydrin rubber, and a butyl acrylate-based rubber.

12. The polyblend of claim 11 in which the vinyl aromatic monomer in the block copolymer rubber is selected from the group consisting of styrene and p-methylstyrene.

13. The polyblend composition according to claim 12 wherein said vinyl aromatic monomer, in said rubber-modified polymer, is selected from the group consisting of styrene and p-methylstyrene, said dicarboxylic acid anhydride is maleic anhydride and said polyblend composition contains up to 20 percent by weight based on monomers of acrylonitrile.

14. The polyblend composition of claim 1 wherein said rubber-modified vinyl chloride resin contains up to 10 percent by weight of a comonomer selected from the group consisting of vinyl acetate, ethylene and propylene.

15. The polyblend composition of claim 1 wherein said vinyl aromatic monomer in said rubber-modified polymer is selected from the group consisting of styrene and p-methylstyrene, and wherein said unsaturated dicarboxylic acid anhydride monomer is maleic anhydride.

16. The polyblend composition of claim 15 wherein said maleic anhydride is present in an amount of 10-25 percent by weight.

17. The polyblend composition of claim 16 wherein said rubber-modified polymer contains up to 25 percent by weight based on monomers of methyl methacrylate.

18. The polyblend composition of claim 17 wherein said vinyl aromatic monomer, maleic anhydride and methyl methacrylate are polymerized in the presence of at least one rubber selected from the group consisting of a block copolymer rubber of butadiene and a vinyl aromatic monomer or hydrogenated such block copolymer rubbers, a copolymer or ethylene and a vinyl acetate, epichlorohydrin rubbers, and polybutadiene.

19. The polyblend composition of claim 18 wherein said rubber is selected from the group consisting of a block copolymer rubber containing 80-50 percent by weight of butadiene and 20-50 percent by weight of a vinyl aromatic monomer selected from the group consisting of styrene and p-methylstyrene.

20. The polyblend composition according to claim 4 in which the graft copolymer is a copolymer of 30-80 percent by weight of methyl methacrylate and 70-20 percent by weight of a vinyl aromatic monomer, selected from the group consisting of styrene and p-methylstyrene.

21. The polyblend composition according to claim 1 wherein said vinyl aromatic monomer, in said rubber-modified polymer, is selected from the group consisting of styrene and p-methylstyrene, and wherein said unsaturated dicarboxylic acid anhydride is maleic anhydride.

22. The polyblend composition according to claim 8 wherein said acrylonitrile is present in an amount up to 20 percent; and said methyl methacrylate is present in an amount up to 25 percent.

23. The polyblend composition according to claim 8 wherein the rubber in said rubber-modified vinyl chloride resin is selected from the group consisting of a terpolymer of ethylene, propylene, and a diene termonomer; and a copolymer of ethylene and a comonomer selected from the group consisting of vinyl acetate, ethyl acrylate and methyl acrylate.

24. The polyblend according to claim 20 wherein said rubber-modified polymer contains up to 25 percent by weight based on monomer of methyl methacrylate, wherein said monomers are polymerized in the presence of at least one rubber selected from the group consisting of polybutadiene, a block copolymer rubber containing 90-45 percent by weight of butadiene and 10-55 percent by weight of a vinyl aromatic monomer, a butyl acrylate-based rubber and a copolymer of ethylene and vinyl acetate; and wherein said vinyl aromatic monomer in said rubber-modified polymer and in said block copolymer rubber is selected from the group consisting of styrene and p-methylstyrene.

* * * * *